United States Patent [19]

Tsutsumi

[11] 4,127,089
[45] Nov. 28, 1978

[54] INTERNAL COMBUSTION ENGINE HAVING MAIN AND AUXILIARY COMBUSTION CHAMBERS

[75] Inventor: Saburo Tsutsumi, Yokohama, Japan

[73] Assignee: Nissan Motor Company, Ltd., Japan

[21] Appl. No.: 698,501

[22] Filed: Jun. 22, 1976

Related U.S. Application Data

[62] Division of Ser. No. 532,395, Dec. 13, 1974, abandoned.

[30] Foreign Application Priority Data

Dec. 22, 1973 [JP] Japan .................................. 49-3636
Dec. 22, 1973 [JP] Japan .................................. 49-3638

[51] Int. Cl.² .......................... F02B 17/00; F02B 19/00
[52] U.S. Cl. .................................. 123/75 B; 123/30 C; 123/32 K; 123/32 SP; 123/191 S
[58] Field of Search ................. 123/30 C, 30 D, 32 B, 123/32 C, 32 D, 32 K, 32 L, 32 SP, 32 ST, 33 D, 75 B, 143 B, 191 S, 191 SP

[56] References Cited

U.S. PATENT DOCUMENTS

| | | | |
|---|---|---|---|
| 2,652,039 | 9/1953 | Weslake ..................... | 123/32 ST X |
| 2,690,741 | 10/1954 | Broderson ..................... | 123/32 ST |
| 3,207,141 | 9/1965 | Freeman, Jr. et al. ......... | 123/32 C X |
| 3,807,369 | 4/1974 | Yagi et al. .................. | 123/32 ST |
| 3,814,067 | 6/1974 | De La Fuente ............... | 123/32 ST |
| 3,877,444 | 4/1975 | Senga et al. ............... | 123/122 AB X |
| 3,916,852 | 11/1975 | Sakurai et al. ............. | 123/32 ST X |

FOREIGN PATENT DOCUMENTS

790,050  11/1935  France ................................ 123/30 D

*Primary Examiner*—Charles J. Myhre
*Assistant Examiner*—Tony M. Argenbright

[57] ABSTRACT

Herein disclosed is an automotive spark-ignition valve-in-head internal combustion engine of the type which has main and auxiliary combustion chambers wherein combustion is initiated in the auxiliary combustion chamber and the resultant flame squirts into the main combustion chamber through a flame passageway whereby the flame fronts radiates out throughout the main combustion chamber from the outlet end of the flame passageway. The outlet end of the flame passageway is located about a "small-clearance-volume" portion of the main combustion chamber so that the flame fronts travel from the small-clearance-volume portion toward a "major-clearance-volume" portion. The small-clearance-volume portion largely corresponds to a squish-quench area in a combustion chamber of the turbulence type such as the wedge combustion chamber.

3 Claims, 13 Drawing Figures

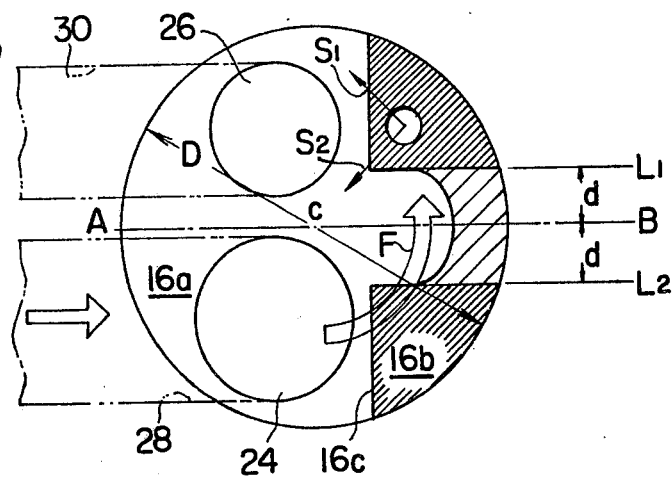
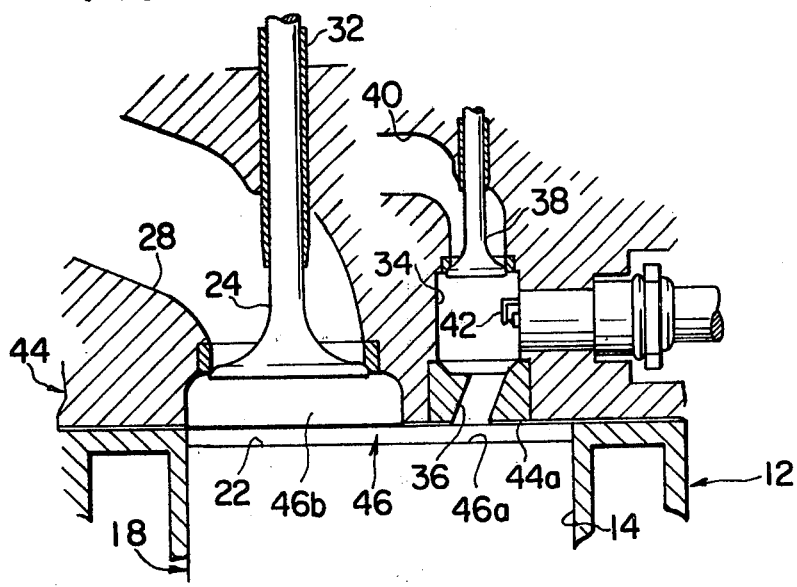
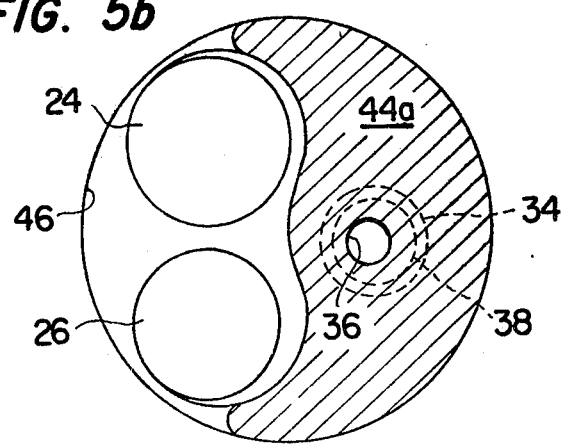

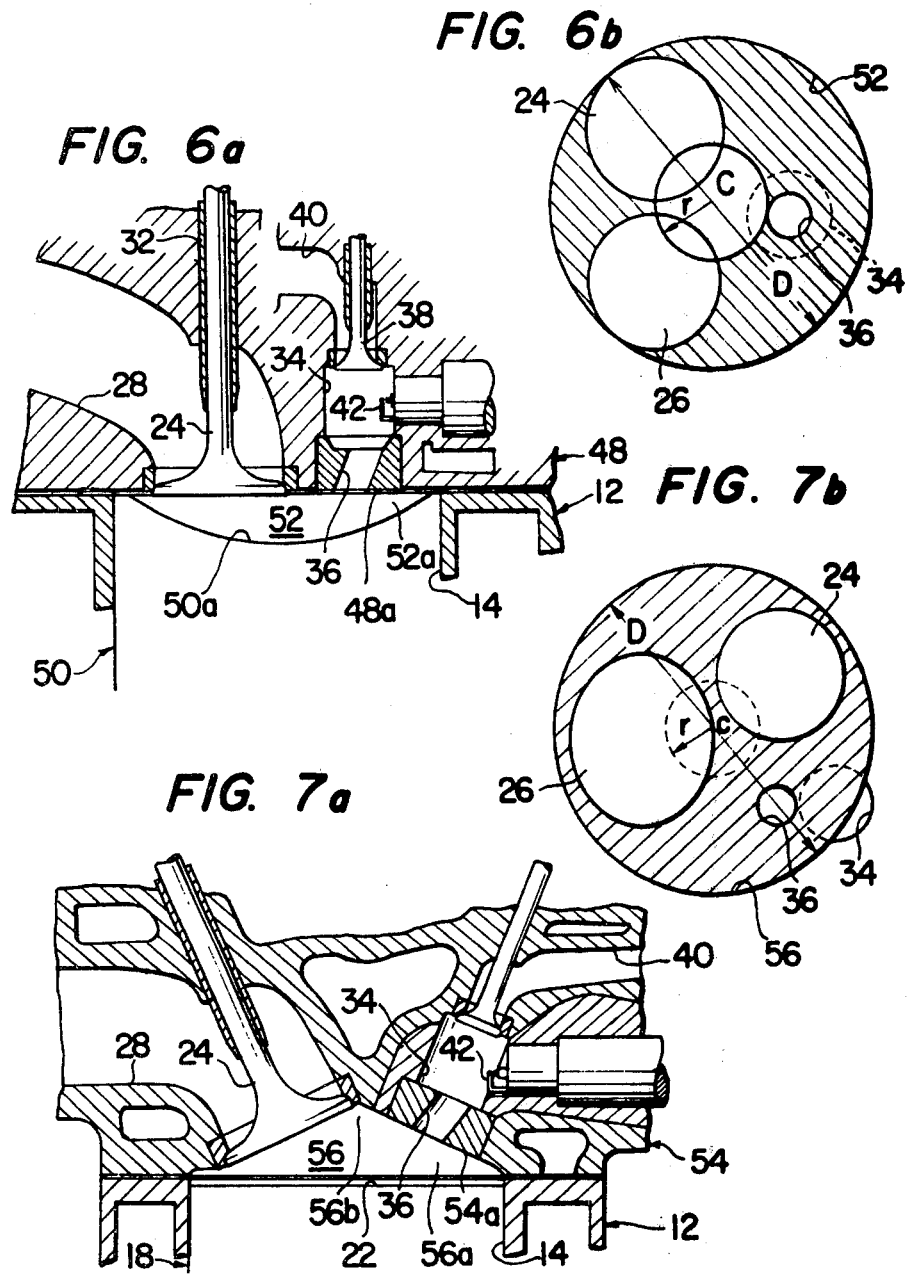

INTERNAL COMBUSTION ENGINE HAVING MAIN AND AUXILIARY COMBUSTION CHAMBERS

This is a division, of application Ser. No. 532,395, filed Dec. 13, 1974 now abandoned.

The present invention relates generally to automotive internal combustion engines and, particularly, to spark-ignition overhead-valve internal combustion engines of automotive vehicles. More particularly, the present invention is directed to an automotive spark-ignition overhead-valve internal combustion engine of the construction having main and auxiliary combustion chambers in each of the engine cylinders.

The spark-ignition overhead-valve internal combustion engines having the main and auxiliary combustion chambers have been developed with a view to minimizing toxic compounds such as hydrocarbons and carbon monoxide contained in exhaust emissions of the engines and are characterized by the use of a leaned air-fuel mixture which contributes to reduction of the toxic unburned residues in the exhaust gases. The main and auxiliary combustion chambers are respectively led from mixture induction units or carburetors which are, in effect, independent from each other so that the main combustion chamber is supplied with a relatively lean air-fuel mixture whereas the auxiliary combustion chamber is supplied with a relatively rich air-fuel mixture during an intake stroke of the engine. An ignition spark plug projects into the auxiliary combustion chamber and fires the relatively rich air-fuel mixture therein for producing flame in the auxiliary combustion chamber at an incipient stage of each of the combustion strokes of the engine. The auxiliary combustion chamber is in communication with the main combustion chamber through a flame passageway so that the flame produced in the former squirt into the latter and ignites the relatively lean air-fuel mixture in the main combustion chamber. The flame, or combustion, is thus initiated in the auxiliary combustion chamber and radiates out into the main combustion chamber from the outlet of the flame passageway opening into the main combustion chamber.

In the prior art internal combustion engines of the nature above described, the flame passageway providing communication between the main and auxiliary combustion chambers usually opens into the main combustion chamber approximately centrally of the clearance space which is bounded at the top by the lower surface of the cylinder head and the faces of the intake and exhaust valves and at the bottom by the piston crown moved to the top dead center position. The particular arrangement is conducive to increasing the power output of the engine because the combustion in the main combustion chamber radiates out from a largest clearance volume portion of the main combustion chamber so that the air-fuel mixture in the main combustion chamber contributing to the combustion stroke of the engine cylinder is fired and combusted in a relatively large proportion at an initial stage of the combustion stroke. A problem is, however, pointed out in that, when the combustible mixture in the main combustion chamber is thus combusted during an early stage of the combustion stroke, the temperature of the exhaust gases tends to be lowered so that the unburned combustible residues contained in the exhaust gases fail to be completely oxidized or "afterburned" when the exhaust gases are being discharged from the exhaust system of the engine. This apparently is contrary to the initial intent of the internal combustion engines of the described character.

Such a problem is pronounced especially where the main combustion chamber is of the turbulent wedge design in which a narrow wedge-shaped squish-quench area is formed between the piston crown and a low inclined face of the roof portion of the cylinder head carrying the intake and exhaust valves. The flame front propagating from the central portion of the clearance volume of the main combustion chamber has a longer time to reach the squish-quench area and, as a consequence, the end-gas which is located in the particular area of the main combustion chamber tends to fail to be completely burned during the combustion stroke. This is causative of a considerable amount of unburned toxic residues in the exhaust gases emitted from the engine.

The present invention contemplates elimination of all these problems that have been encountered in the internal combustion engines of the type having the main and auxiliary combustion chambers and it is, accordingly, an important object of the present invention to provide an improved spark-ignition overhead-valve internal combustion engine having main and auxiliary combustion chambers which are so arranged as to permit of complete combustion of the air-fuel mixture in the entire area of the main combustion chamber so that the initial intent of the engine to minimize the proportion of the unburned residues in the exhaust gases can be advantageously achieved. Another important object of the present invention is to reduce the proportion of the air-fuel mixture burned at an incipient stage of the combustion stroke in the internal combustion engine of the described general character. With the limited amount of air-fuel mixture contributing to the combustion at an incipient stage of the combustion stroke, there will be achieved significant reduction in the peak combustion temperature and the peak pressure magnitude in the main combustion chamber so that not only the proportions of the unburned hydrocarbons and carbon monoxide in the exhaust gases can be successfully lessened but production of nitrogen oxides which are other major sources of the vehicular air pollution can be advantageously inhibited.

In accordance with the present invention, these and other objects will be accomplished basically in an automotive spark-ignition valve-in-head internal combustion engine which comprises a cylinder block formed with a cylinder bore, a reciprocating piston axially movable in the cylinder bore, a cylinder head which is positioned at the top of the cylinder block and forming a main combustion chamber above the cylinder bore, the main combustion chamber containing therein a small-clearance-volume-portion which is bound at the top by a lower end face of a roof portion of the cylinder head and at the bottom by the top face or crown of the reciprocating piston moved into the top-dead-center position thereof, the cylinder head being formed with an auxiliary combustion chamber which is located above the roof portion of the cylinder head, a main intake port leading to the main combustion chamber over a main intake valve, an auxiliary intake port leading to the auxiliary combustion chamber over an auxiliary valve and an exhaust port leading from the main combustion chamber over an exhaust valve, an ignition spark plug projecting into the auxiliary combustion chamber, and means for forming a flame passageway providing constant communication between said main and auxiliary passageways, said flame passageway having an outlet end which is open into the above mentioned small-clearance-volume portion of the main combustion chamber. The outlet end of the flame passageway above mentioned is preferably located in predetermined geometrical relation to the aforesaid roof portion of the cylinder head and/or the center point of the cross section of the main combustion chamber and directed in a predetermined angular range determined on the basis of the direction of swirl rotation of the air-fuel mixture spurting into the main combustion chamber from the outlet end of the flame passageway.

The features and advantages of the internal combustion engine according to the present invention will be more clearly understood from the following description taken in conjunction with the accompanying drawings, in which:

FIG. 1b is a plan view of the top end of the main combustion chamber of the embodiment illustrated in FIG. 1a;

FIG. 3b is a plan view showing the top end of the main combustion chamber of the embodiment illustrated in FIG. 3a;

FIG. 4b is a plan view of the top end of the main combustion chamber of the embodiment illustrated in FIG. 4a;

FIG 5a is a fragmentary longitudinal sectional view schematically showing a fourth preferred embodiment of the internal combustion engine according to the present invention;

FIG. 5b is a plan view of the top end of the main combustion chamber of the embodiment illustrated in FIG. 5a;

FIG. 6a is a fragmentary longitudinal sectional view schematically showing a fifth preferred embodiment of the internal combustion engine according to the present invention;

FIG. 6b is a plan view of the top end of the main combustion chamber of the embodiment illustrated in FIG. 6a;

FIG. 7a is a fragmentary longitudinal sectional view showing a sixth preferred embodiment of the internal combustion engine according to the present invention; and FIG. 7b is a plan view of the top end of the main combustion chamber of the embodiment illustrated in FIG. 7a.

Figure 1A:
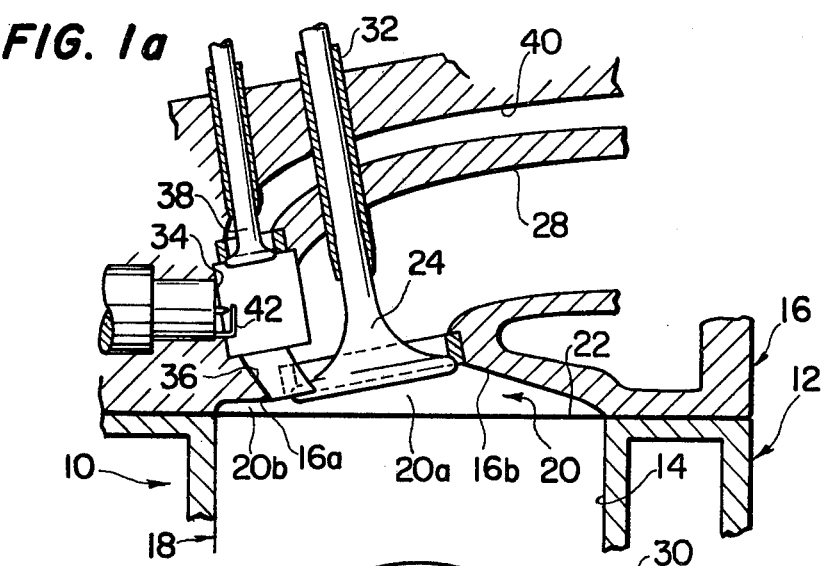
FIG. 1a is a fragmentary longitudinal sectional view schematically showing a first preferred embodiment of the internal combustion engine according to the present invention.
Figure 1B:
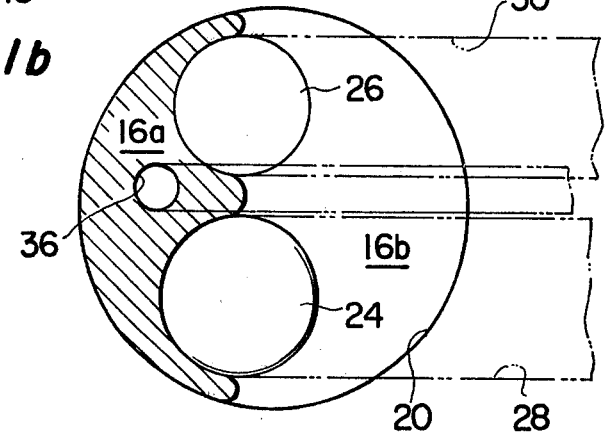

Referring to the drawings, first to FIGS. 1a and 1b, the spark-ignition overhead-valve internal combustion engine embodying the present invention includes a cylinder 10 which consists of a cylinder block 12 formed with a cylinder bore 14 and a cylinder head 16 bolted or otherwise secured to the top end of the cylinder block 12, as is customary in the art. A reciprocating piston 18 is axially movable in the cylinder bore 14 between the top and bottom dead center positions thereof, forming a main combustion chamber 20 between the top face or crown 22 of the piston 18 and the lower end faces of roof portions 16a and 16b of the cylinder head 16. The internal combustion engine to which the present invention appertains is specifically of the I-head or overhead-valve construction as previously mentioned and, thus, has in-line intake and exhaust valves 24 and 26 having their respective valve faces located at the top of the main combustion chamber 20. The main combustion chamber 20 is, thus, bound at its top by the lower end faces of the roof portions 16a and 16b of the cylinder head 16 and the valve faces of the intake and exhaust valves 24 and 26 and at the bottom by the top face or crown 22 of the reciprocating piston 18. Behind the valve faces of the intake and exhaust valves 24 and 26 are located intake and exhaust ports 28 and 30, respectively, of the cylinder 10. The intake port 28 is in communication with an intake manifold (not shown) of the engine, whereas the exhaust port 30 is led to the open air through an exhaust manifold (not shown) of the engine as is customary in the art. The intake and exhaust ports 28 and 30 are shown to be formed in the cylinder head 16.

The main combustion chamber 20 in the internal combustion engine herein shown is assumed to be of the turbulent wedge construction as seen in FIG. 1 and, thus, has a major-clearance-volume portion 20a located centrally of the main combustion chamber 20 and a small-clearance-volume portion 20b which is defined by an appreciably slanted lower end face of the roof portion 16a of the cylinder head 16 and a matched portion of the top face or crown 22 of the piston 18. The term "clearance volume" herein referred to is intended to mean a volume, or space, which is bound at the top by the lower end faces of the roof portions 16a and 16b of the cylinder head 16 and the valve faces of the intake and exhaust valves 24 and 26 and at the bottom by the top face 22 of the piston 18 which is moved to the top dead center position thereof. The small-clearance-volume portion 20b thus contains therein a squish-quench area of the turbulent wedge combustion chamber 20. The roof portion 16a of the cylinder head 16 is, furthermore, herein defined as forming part of that portion of the cylinder head 16 which carries the stem portions of the intake and exhaust valves 24 and 26 through respective valve guide members of which only the valve guide member for the intake valve 24 is illustrated as at 32 in FIG. 1a. The particular roof portion 16a of the cylinder head 16 is indicated by a hatched area in FIG. 1b.

The cylinder head 16 or, more particularly, the roof portion 16a of the cylinder head 16 is formed with an auxiliary combustion chamber 34 which is located above and in the vicinity of the previously mentioned small-clearance-volume portion 20b of the main combustion chamber 20, as seen in FIG. 1a. The auxiliary combustion chamber 34 is in constant communication with the main combustion chamber 20 through a flame passageway 36 which is formed in the roof portion 16a of the cylinder head 16 and which has an outlet end opening into the small-clearance-volume portion 20b of the main combustion chamber 20. At an upstream end of the auxiliary combustion chamber 34 is located an intake valve 38 which is operated at timings related to the timings at which the intake and exhaust valves 24 and 26 are actuated during operation of the engine. The intake valve 38 for the auxiliary combustion chamber 34 is also carried by that portion of the cylinder head 16 which is integral with the roof portion 16a and is shown to be axially movably received in a valve guide member 40 in FIG. 1a. Behind the intake valve 38 for the auxiliary combustion chamber 34 is located an auxiliary intake port 40 which is also formed in the cylinder head 16. The auxiliary intake port 40 leads from a mixture induction unit (not shown) which is separate from an induction unit (not shown) connected to the intake manifold leading to the main intake port 28. As previously noted, the mixture induction unit for the main combustion chamber is arranged to supply a relatively lean air-fuel mixture to the main combustion chamber 20 and the induction unit associated with the auxiliary combustion chamber 34 is arranged to deliver a relatively rich air-fuel mixture to the auxiliary combustion chamber 34. Generally, the air-fuel mixture supplied to the main combustion chamber 20 has an air-to-fuel ratio of the range of from about 15:1 to about 30:1 whereas the air-fuel mixture supplied to the auxiliary combustion chamber 34 has an air-to-fuel ratio of the range of about 1:1 to about 10:1. The relatively rich air-fuel mixture thus directed into the auxiliary combustion chamber 34 is ignited by means of an ignition spark plug 42 projecting into the auxiliary combustion chamber 34 as illustrated in FIG. 1a. The flame thus produced in the auxiliary combustion chamber as a result of the combustion of the relatively rich air-fuel mixture spurts into the main combustion chamber 20 through the flame passageway 36 and fires the relatively lean air-fuel mixture in the main combustion chamber 20. The flame, or combustion, is thus initiated in the auxiliary combustion chamber 34 and radiates out in the main combustion chamber 20 from the outlet of the flame passageway 36 so that the flame front travels in the main combustion chamber 20 from the small-clearance-volume portion 20b or, in other words, the squish-quench area of the main combustion chamber 20 toward the major-clearance-volume portion 20a of the main combustion chamber 20. The air-fuel mixture in the main combustion chamber 20 is thus fired and combusted only in a limited proportion at an incipient stage of the combustion stroke because the flame front propagates initially from the small-clearance-volume portion 20b of the main combustion chamber 20. The prolonged flame-path travel and the reduced proportion of the air-fuel mixture contributing the combustion during the incipient stage of the combustion stroke result in reduction in the peak combustion temperature and the peak pressure magnitude in the main combustion chamber 20 and, accordingly, in reduction of the toxic nitrogen oxides. Since, moreover, the combustion in the main combustion chamber 20 proceeds for a prolonged period of time due to the prolonged travelling distance of the flame, the exhaust gases emitted from the engine during the exhaust stroke of the engine has a temperature which is high enough to permit of complete oxidization of the unburned combustible residues initially contained in the exhaust gases and thus the quantities of the unburned hydrocarbons and carbon monoxide contained in the exhaust gases finally emitted to the open air can be reduced to a minimum. The flame passageway 36 providing the communication between the main and auxiliary combustion chambers 20 and 34 opens into the major-clearance-volume portion 20a of the main combustion chamber 20 in the prior art internal combustion engine of the described character and, as a consequence, the end-gas staying in the small-clearance-volume portion 20b or, in other words, the squish-quench area of the main combustion chamber 20 is apt to be left unburned or only partly burned during the combustion stroke and thus makes another important contributory cause of the emission of the toxic hydrocarbons and carbon monoxide. In the embodiment illustrated in FIGS. 1a and 1b, however, the flame passageway 36 has its outlet end open into the small-clearance-volume portion 20b of the main combustion chamber 20 and, for this reason, the combustion or the flame front radiates out from the small-clearance-volume portion 20b or the squish-quench area of the main combustion chamber 20 so that the air-fuel mixture occupying the small-clearance-volume portion 20a is fired at an incipient stage of the combustion stroke and fully combusted with the agency of the hot combusted gases produced in the major-clearance-volume portion 20a of the main combustion chamber 20.

Figure 2:
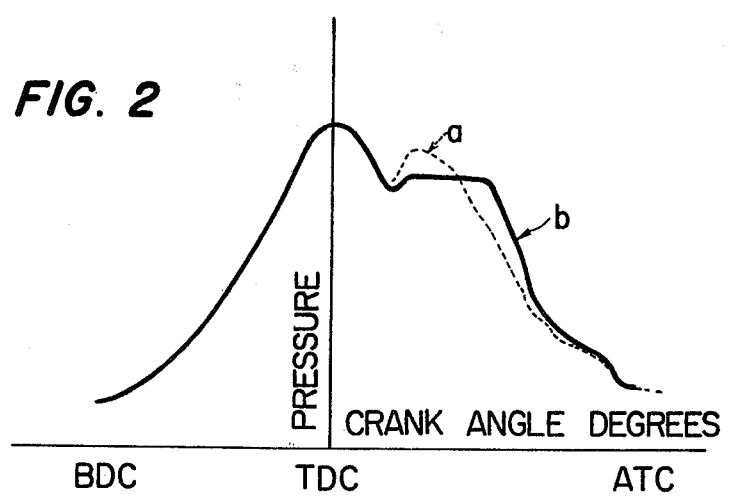
FIG. 2 is a pressure-time showing pressure-time curves of an entire cycle of operation of a prior art internal combustion engine of the described type (indicated by dotted line) and the engine embodying the present invention (indicated by full line)

FIG. 2 illustrates curves indicating the variation of the pressure in the wedge-type main combustion chamber of a prior art internal combustion engine of the described character (indicated by curve a in dotted line) and the variation of the pressure in the main combustion chamber of the embodiment illustrated in FIGS. 1a and 1b (indicated by curve b in full line). The axis of abscissa represents, in terms of degrees of crankshaft rotation, the time period during which the piston is moved from the before-top-center position (BTC) to the after-top-center position (ATC) across the top-dead-center position (TDC) which is indicated at the origin of the coordinates. The pressures indicated by the axis of ordinate have been measured under predetermined operating conditions of the engines with the charging efficiencies set at about 50 percent and the revolution speed set at about 1500 rpm. (The charging efficiency herein mentioned is a ratio of the volume of air in the air-fuel mixture as converted into the volume under the normal atmospheric pressure versus the piston displacement of the engine.) As will be seen from the curve b of the diagram illustrated in FIG. 2, the pressure in the main combustion chamber of the internal combustion engine embodying the present invention varies in a pattern which is reminiscent of the pressure-time curve of the constant-pressure combustion and, for this reason, not only the peak pressure in the engine cylinder can be significantly reduced but the exhaust gases have a temperature which is higher than that of the exhaust gases emitted from the prior art internal combustion engine of the described type.

Figure 3A:
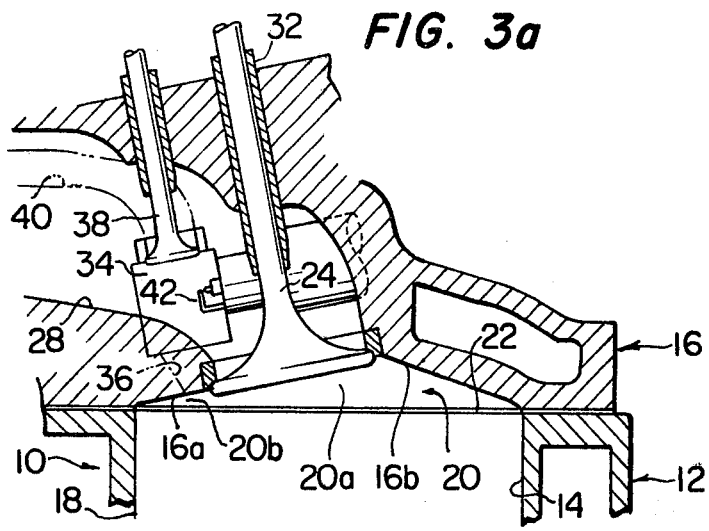
FIG. 3a is a fragmentary longitudinal sectional view schematically showing a second preferred embodiment of the internal combustion engine according to the present invention.
Figure 3B:
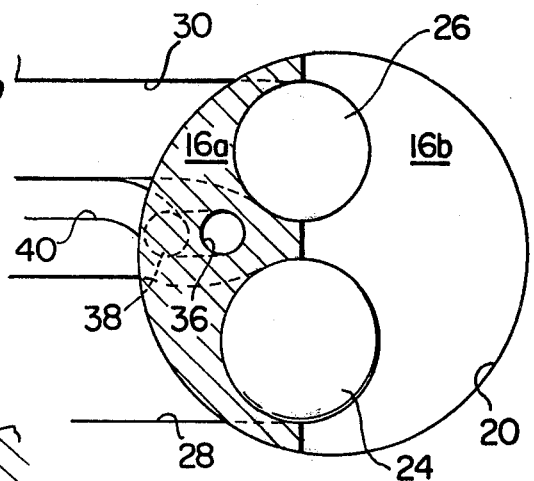

FIGS. 3a and 3b illustrate a modification of the embodiment shown in FIGS. 1a and 1b and, thus, the parts and members corresponding to those in the embodiment of FIGS. 1a and 1b are designated by like reference numerals and characters. While the auxiliary combustion chamber 34 is located sidewise of the intake and exhaust ports 28 and 30 in the embodiment of FIGS. 1a and 1b, the intake and exhaust ports 28 and 30 formed in the cylinder head 16 of the embodiment illustrated in FIGS. 3a and 3b are so arranged as to override the auxiliary combustion chamber 34 and, at the same time, the intake port 40 leading to the auxiliary chamber 34 is arranged to extend along and in close proximity to the exhaust port 30 leading from the main combustion chamber 20. With the portings thus arranged, the heat of the exhaust gases being passed through the exhaust port 30 is, in part, transferred to the intake port 40 for the auxiliary combustion chamber 34 so that the air-fuel mixture supplied to the auxiliary combustion chamber 34 is preheated while the same is flowing through the intake port 40. This will assure stabilized firing characteristics of the air-fuel mixture in not only the auxiliary combustion chamber 34 but also the main combustion chamber 20 especially during starting of the engine from a cold state or when the engine is operated under cold weather conditions. Since, moreover, the intake port 40 for the auxiliary combustion chamber 34 need not override or overreach the intake and exhaust ports 28 and 30 for the main combustion chamber 20 contrary to the porting arrangement of the embodiment illustrated in FIGS. 1a and 1b, the entire length of the intake port 40 can be significantly reduced, eliminating the dead volume or space of the intake port 40. This will provide improved transient characteristics of the cyclic operation of the auxiliary mixture induction and combustion units and accordingly stabilized performance characteristics of the engine as a whole.

Figure 4A:
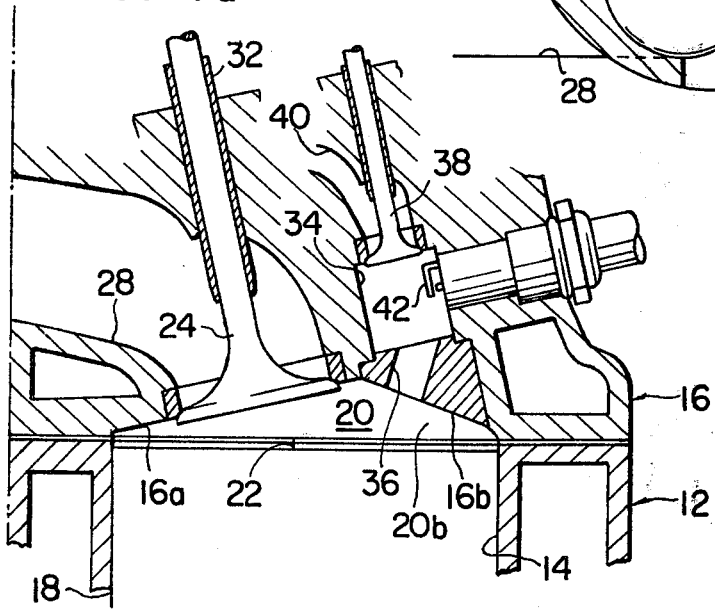
FIG. 4a is a fragmentary longitudinal sectional view schematically showing a third preferred embodiment of the internal combustion engine according to the present invention.

FIGS. 4a and 4b illustrate a third preferred embodiment of the internal combustion engine according to the present invention. The internal combustion engine herein shown is constructed of parts and members which are essentially similar to those constituting the internal combustion engine illustrated in FIGS. 1a and 1b or FIGS. 3a and 3b and, thus, the parts and members corresponding to those of the first and second embodiments are also designated by like reference numerals and characters. While, however, the flame passageway 36 is formed in the roof portion 16a of the cylinder head 16 in the embodiment illustrated in FIGS. 1a and 1b or FIG. 3a or 3b, the flame passageway 36 in the embodiment shown in FIGS. 4a and 4b is formed in the previously mentioned roof portion 16b of the cylinder head 16. The roof portion 16b of the cylinder head 16 has a lower end surface which is upwardly inclined from its outer perimeter and thus defines a small-clearance-volume portion 20b which is bound at the top by the inclined lower end face of the roof portion 16b and at the bottom by the top face 22 of the piston 18 in the top-dead-centerposition. The flame passageway 36 providing communication between the main and auxiliary combustion chambers 20 and 34 has an outlet open into the above mentioned small-clearance-volume portion 20b of the main combustion chamber 20. It will be further seen from the illustration of FIGS. 4a and 4b that the intake and exhaust valves 24 and 26 for the main combustion chamber 20 are carried by and, at the same time, the auxiliary combustion chamber 34 is formed in that portion of the cylinder head 16 which is integral with the roof portion 16b. The particular roof portion 16b of the cylinder head 16 is indicated by a hatched area in FIG. 4b. Designated by 16c in FIGS. 4a and 4b is a parting line, or an edge, between the roof portions 16a and 16b of the cylinder head 16.

The third embodiment shown in FIGS. 4a and 4b is distinct over the embodiment of FIGS. 1a and 1b or FIG. 3a or 3b in that consideration is paid to impart swirl rotation of the combustion gases about a vertical axis of the main combustion chamber for enhancing the turbulence of the combustion gases in the main combustion chamber. In FIG. 4b, the main combustion chamber 20 is shown to have on its cross section a center line AB which passes through the vertical axis C of the main combustion chamber 20 and which is perpendicular to the previously mentioned parting line or edge 16c between the roof portions 16a and 16b of the cylinder head 16. Parallel lines $L_1$ and $L_2$ are further drawn on both sides of the center line AB in such a manner that each of the lines $L_1$ and $L_2$ is spaced a given distance $d$ from the center line and perpendicularly cuts off the parting line 16c between the roof portions 16a and 16b of the cylinder head 16. With the lines $L_1$ and $L_2$ thus drawn, two identical regions of approximately sector forms are defined on the cross section of the main combustion chamber 20 and underneath the roof portion 16b of the cylinder head 16, as indicated by densely hatched areas in FIG. 4b. Each of these regions of the approximately sector forms is enclosed by the line $L_1$ or $L_2$, part of the parting line 16c cut off by the lines $L_1$ and $L_2$, and an arc which is described by a portion of the circular perimeter of the main combustion chamber 20 (which perimeter is apparently in correspondence with the circumference of the cylinder bore 14). The third embodiment of the internal combustion engine according to the present invention is characterized in that the flame passageway 36 providing the communication between the main and auxiliary combustion chambers 20 and 34 has its outlet end located over either of the above mentioned regions of the approximately sector forms as seen in FIG. 4b. The experiments conducted by the inventor have revealed that the distance $d$ between the center line AB and each of the parallel lines $L_1$ and $L_2$ should be so selected as to satisfy the relation $d/D \geqq 0.15$, where D is the diameter of the main combustion chamber 20. Here, it is apparent that the value of $d$ is smaller than the value of D/2. In the embodiment shown in FIGS. 4a and 4b, furthermore, the flame passageway 36 is so arranged as to extend, when viewed on a plan parallel to the cross section of the main combustion chamber 20, in a direction falling within an angular range having one end substantially in agreement with the direction (indicated by F in FIG. 4b) of the swirling flow of the air-fuel mixture spurting from the intake port 28 into the main combustion chamber 20 as indicated by an arrow $S_1$ in FIG. 4b and the other end directed toward the center of the cross section or the vertical axis C of the main combustion chamber 20 as indicated by an arrow $S_2$. With the flame passageway 36 directed within such an angular range, the flame squirting into the main combustion chamber 20 from the flame passageway 36 will promote the turbulence of the combusted gases produced in the main combustion chamber 20 and thus contribute to the complete combustion of the mixture and accordingly to elimination of the toxic unburned residues in the exhaust gases to be emitted from the engine.

While the first, second and third embodiments of the present invention have thus far been described as being applied to the internal combustion engines having the main combustion chambers of the turbulent wedge design, the improvement provided by the present invention can be incorporated into not only the engines of such a type but internal combustion engines having combustion chambers of numerous other designs including, for example, the so-called "bathtub" combustion chambers (FIGS. 5a and 5b), the "piston-side" combustion chambers (FIGS. 6a and 6b), the "pentroof" combustion chambers (FIGS. 7a and 7b) and the non-turbulent or improved (viz., turbulent) hemispherical combustion chambers (not shown in the drawings)

which are similarly constructed to the pentroof type combustion chambers.

Referring to FIGS. 5a and 5b, the internal combustion engine having the bath-tub combustion chamber includes a cylinder head 44 which defines the top end of a main combustion chamber 46 of the bath-tub type. The cylinder head 44 has a roof portion 44a having a flat lower end face located in proximity to the top end of the cylinder bore 14. A narrow space 46a is thus formed between the flat lower end face of the roof portion 44a of the cylinder head 44 and the top face 22 of the reciprocating piston 18 when the piston 18 is moved to the top-dead-center position thereof. The space 46a thus formed provided a small-clearance-volume portion of the main combustion chamber 46. The cylinder head 44 is further formed with a bath-tub-shaped recess above the top end of the cylinder bore 14. The bath-tub-shaped recess is in communication with the intake and exhaust ports 26 and 28 over the intake and exhaust valves 28 and 30, respectively and defines a major-clearance-volume portion 46b which is bound at the top by the valve faces of the intake and exhaust valves 24 and 26 and at the bottom by the top face 22 of the piston 16 in the top-dead-center position thereof. The flat lower end face of the roof portion 44a of the cylinder head 44 forming the small-clearance-volume portion 46a of the main combustion chamber 46 is indicated by a hatched area in FIG. 5b.

The intake and exhaust valves 26 and 28 are carried by that portion of the cylinder head 44 which forms part of the above mentioned roof portion 44a of the cylinder head 44. The particular portion of the cylinder head 44 which forms part of the roof portion 44a is formed with an auxiliary combustion chamber 34 provided with an auxiliary intake valve 38 and leading from an auxiliary intake port 40, similarly to each of the embodiments thus far described. The auxiliary combustion chamber 34 is in constant communication with the main combustion chamber 44 through a flame passageway 36 which is formed in the roof portion 44a of the cylinder head 44 and which has an outlet end open into the above mentioned small-clearance-volume portion 46a of the main combustion chamber 46. The flame passageway 36 is preferably directed toward the main combustion chamber in an angular relation previously discussed with reference to FIG. 4b.

Turning to FIGS. 6a and 6b of the drawings, the internal combustion chamber of the piston-side chamber type has a cylinder head 48 which has a roof portion having a flat lower end face located in proximity to the top end of the cylinder bore 14. The intake and exhaust valves 24 and 26 have valve faces which are thus movable to and from the positions substantially flush with the lower end face of the roof portion of the cylinder head 48. The reciprocating piston, now designated by reference numeral 50, has a counterdomed or hemispherically concave top end face 50a. A main combustion chamber 52 is thus defined at the top by the flat lower end face of the roof portion of the cylinder head 48 and the valve faces of the intake and exhaust valves 24 and 26 and at the bottom by the hemispherically concave top face 50a of the reciprocating piston 50. The hemispherically concave top face 50a of the piston 50 has an upwardly slanted circumferential portion so that a small-clearance-volume portion 52a of the main combustion chamber 52 is defined between the flat lower end face 48a of the roof portion of the cylinder head 48 and a corresponding part of the circumferential portion of the hemispherically concave top face 50a of the reciprocating piston 50 when the piston 50 is moved into the top-dead-center position thereof as seen in FIG. 6a. The cylinder head 48 is formed with an auxiliary combustion chamber 34. A flame passageway 36 leads from the auxiliary combustion chamber 34 and opens at its leading end into the above mentioned small-clearance-volume portion 52a of the main combustion chamber 52. The outlet end of the flame passageway 36 is preferably so located as to be spaced from the vertical axis of the main combustion chamber 52 a distance $r$ which satisfies the relation $D/6 < r < D/2$, where D is the diameter of the main combustion chamber 52. In other words, the outlet end of the flame passageway 36 is preferably located within a region of the cross section of the main combustion chamber 52 excepting a circular area having a center at the vertical axis C of the main combustion chamber 52 and a radius $r$ satisfying the above mentioned relation as well as the circular areas corresponding to the outlet and inlet ends of the intake and exhaust valves 24 and 26, respectively. The preferred region for locating the outlet end of the flame passageway 36 is indicated by a hatched area in FIG. 6b.

FIGS. 7a and 7b illustrate an embodiment of the present invention incorporated into an internal combustion engine of the pentroof combustion chamber type which is a modified version of the hemispherical combustion chamber. The internal combustion engine includes a cylinder head 54 which has a roof portion 54a having a slanted lower end face and which carries thereon the intake and exhaust valves 24 and 26 which are also inclined, thereby forming an approximately conical main combustion chamber 56 above the flat top face 22 of the reciprocating piston 18. The main combustion chamber 56 thus consists of a small-clearance volume portion 56a bound at the top by the inclined lower end face of the roof portion 54a of the cylinder head 54 and at the bottom by a corresponding portion of the flat top face 22 of the piston 18 and a major-clearance-volume portion 56b adjacent to the top end portion of the conical main combustion chamber 56. The cylinder head 54 has formed in its portion adjacent to the roof portion 54a thereof an auxiliary combustion chamber 34 which is in communication with the main combustion chamber 56 through a flame passageway 36. As will be seen from FIG. 7a, the flame passageway 36 terminates above the above mentioned small-clearance-volume portion 56a of the main combustion chamber 56. The outlet end of the flame passageway 36 is preferably spaced from the vertical axis C of the main combustion chamber 56 a distance $r$ satisfying the relation previously mentioned with respect to the embodiment of FIGS. 6a and 6b. The preferred region in which the outlet end of the flame passageway 36 may be located is indicated by a hatched area in FIG. 7b.

While various preferred embodiments of the present invention have thus far been described with reference to the drawings, it should be borne in mind that the such embodiments are merely for the purpose of illustration of the gist of the present invention and that various modifications may be made therefrom and the gist of the invention may be realized in any types of spark-ignition valve-in-head internal combustion engines for automotive use insofar as the engines have main and auxiliary combustion chambers of the described nature.

What is claimed is:

1. In a flame ignition type internal combustion engine having a cylinder block with a cylinder bore, a piston movable in said cylinder bore, a cylinder head positioned atop said cylinder block to form a wedge-shaped main combustion chamber and having an auxiliary combustion chamber in the vicinity of said main combustion chamber, said main combustion chamber consisting of first and second volume portions which are separated from each other by an imaginary plane which is parallel to the center axis of said cylinder bore, said imaginary plane containing a parting line by which an inner surface of said cylinder head constituting a roof portion of said main combustion chamber is separated into first and second inclined surfaces which respectively constitute roof portions of said first and second volume portions; intake and exhaust valves operatively positioned at said first inclined surface; and a flame passageway providing a fluid communication between said main combustion chamber and said auxiliary combustion chamber, the improvement comprising providing an outlet end of said flame passageway open to said second volume portion and located within one of two regions of substantially sector forms, said sector forms casting shadows on a plane perpendicular to the center axis of said cylinder bore, the outline of each of said shadows being defined by a line cast on said plane from said parting line, one of two parallel lines which are drawn on said plane perpendicular to said center axis and are parallel to and spaced a predetermined distance from a center line which lies on said plane perpendicular to said center axis and passes through said center axis of said cyliner bore, and an arc described by a portion of the perimeter of said main combustion chamber, further in which said distance between each of said parallel lines and said center line is selected in a manner to satisfy the relation $d/D \geq 0.15$ where $d$ represents said distance and D represents the diameter of said cylinder bore.

2. A flame ignition type internal combustion engine as claimed in claim 1, in which the axis of said flame passageway extends, on a plane perpendicular to the axis of said cylinder bore, in a direction falling within an angular range having one end substantially in agreement with the direction of a swirling flow of an air-fuel mixture spurting into said main combustion chamber through said intake valve and the other end directed toward the center of the transverse cross section of said main combustion chamber.

3. A flame ignition type internal combustion engine as claimed in claim 1, in which the axis of said flame passageway is inclined at an acute angle with respect to a plane perpendicular to the axis of said cylinder bore and lies on a plane skewed at an angle in a range from a first angle where said plane is tangential to a circle swept out by a swirling flow of an air fuel mixture spurting into said main combustion chamber through said intake valve to a second angle where said plane contains the axis of said cylinder bore.

* * * * *